Sept. 23, 1958  R. L. ESKEN  2,852,851
LOADING APPARATUS
Filed Feb. 23, 1955  2 Sheets-Sheet 1
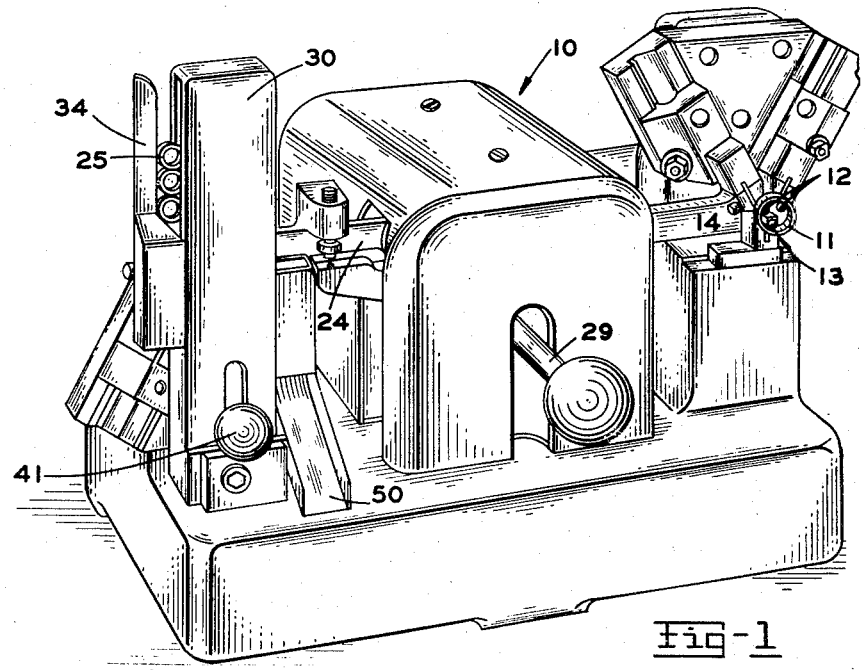
Fig-1
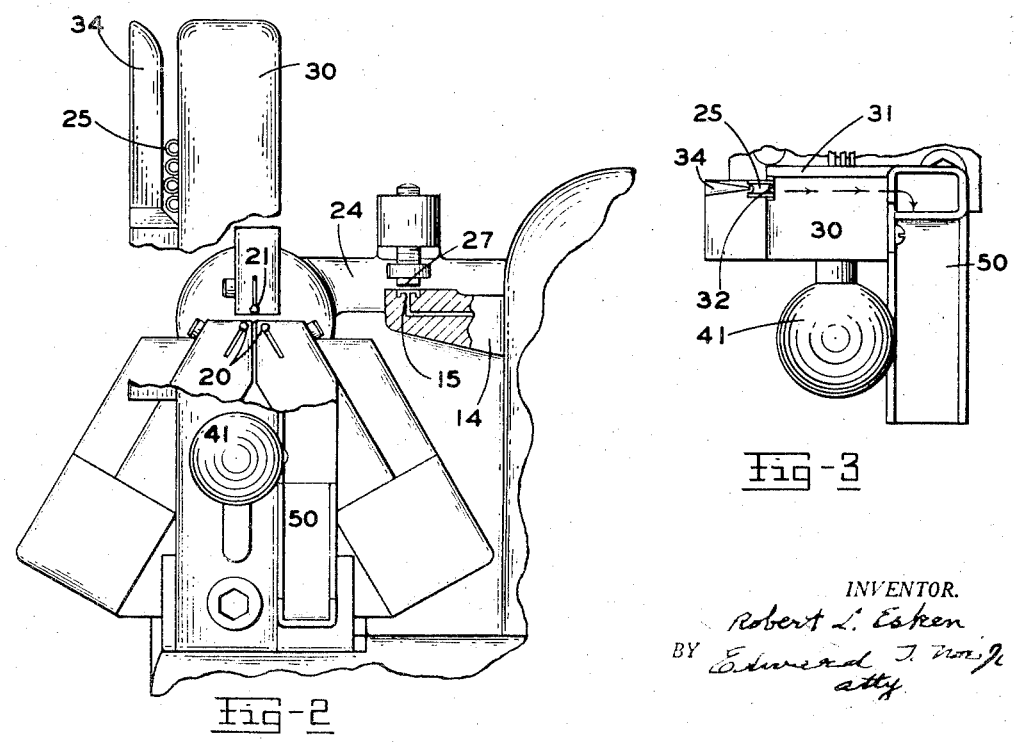
Fig-2
Fig-3
INVENTOR.
Robert L. Esken
BY Edward T. Nos, Jr.
atty.

Sept. 23, 1958 R. L. ESKEN 2,852,851
LOADING APPARATUS
Filed Feb. 23, 1955 2 Sheets-Sheet 2

INVENTOR.
Robert L. Esken
BY Edward T. Roe Jr.
atty.

:::::::::::::::::::::::::::::::::::::::::::::::::::::::::::::::::::::

United States Patent Office 2,852,851
Patented Sept. 23, 1958

2,852,851
LOADING APPARATUS

Robert L. Esken, Dayton, Ohio, assignor, by mesne assignments, to The Sheffield Corporation, a corporation of Delaware Application February 23, 1955, Serial No. 490,093

4 Claims. (Cl. 33—174)

This invention relates to a loading apparatus and more particularly to an apparatus for use with a gauging device to load parts into gauging position and remove them therefrom following gauging.

It is an object of this invention to provide a loading device for association with a gauging station of a gauge for loading a part into position to be gauged and for removing it following gauging, the device being extremely simple in construction and easy to operate for loading and removing a single part at a time.

It is a further object to provide such an apparatus for use with a gauging device of the type comprising a pair of lower fixed contacts and a movable upper contact for association with the raceway of an inner bearing race or a similar part, the apparatus being simply operated by an upward movement of a movable member to remove a part from the lower contacts following gauging and upon lowering of the member to carry a race into position for movement onto the lower contacts by gravity and into position for engagement by the upper contact during gauging.

It is a further object to provide such an apparatus as referred to above wherein a vertically movable slide is carried upward to receive a race and to simultaneously remove a previously gauged race from the lower pair of contacts, following which upon lowering of the slide the loaded race is carried into position for movement by gravity onto the lower pair of contacts for gauging.

It is a further object to provide such an apparatus wherein through simple vertical reciprocating movement of a single movable slide element bearing races are reliably loaded into gauging position and removed therefrom, making possible more rapid gauging operations in an efficient manner.

Figure 4:
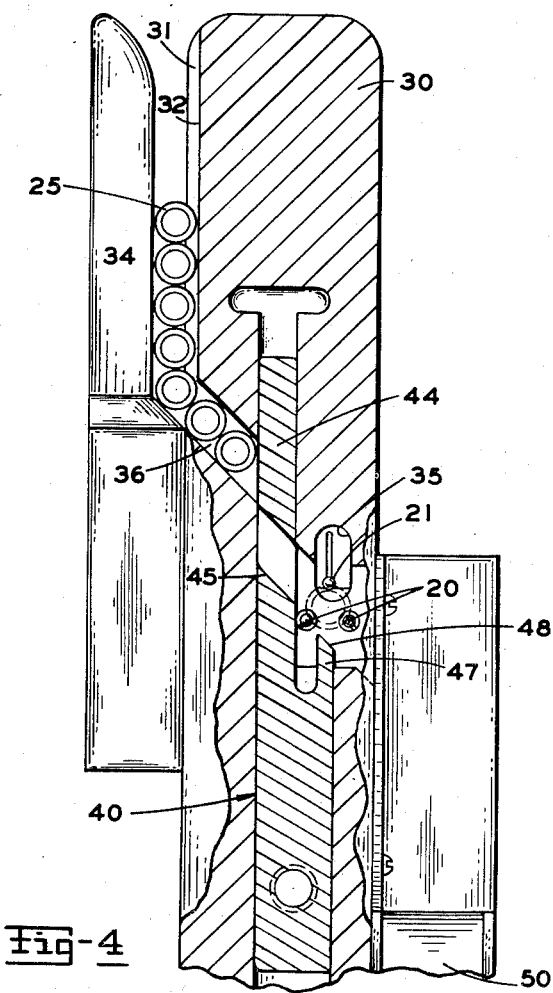
Figure 5:
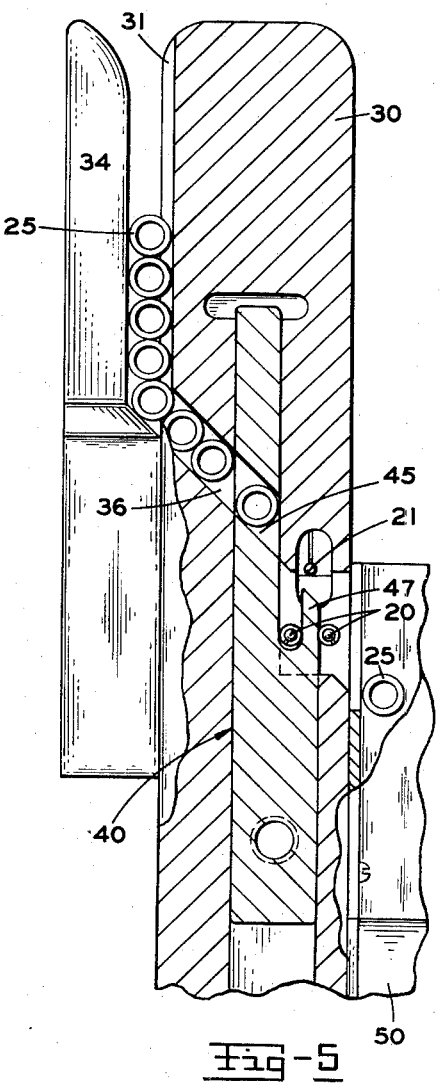
Figure 6:
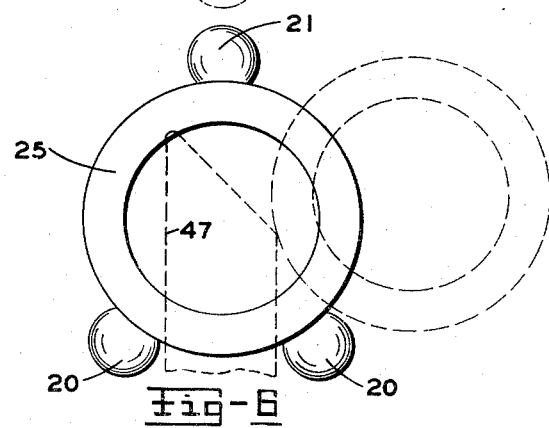

Other objects and advantages of the invention will be apparent from the following description, the appended claims and accompanying drawings, in which, Figure 1 is a view in perspective of a feeding or loading apparatus embodying the features of the present invention shown associated with a gauge for matching the raceways of inner and outer bearing races, Figure 2 is a view of the lefthand end of the assembly of Figure 1 shown with the loading apparatus partially broken away, Figure 3 is a plan view of the loading apparatus and a portion of the gauge associated therewith, Figures 4 and 5 are fragmentary sectional views illustrating the loading device in loading and unloading positions respectively, and Figure 6 is a diagrammatic illustration of the association of the race with the gauging contacts during gauging and during removal of the race following gauging.

The particular apparatus illustrated for the purpose of disclosing the features of the present invention is one provided for loading inner bearing races into an existing type bearing matching gauge for gauging and for removing the inner race following the gauging operation. The invention is not limited in its application to loading and unloading such parts, nor is it limited to the specific structural details illustrated or to use with such an exemplary gauging device.

The instrument illustrated is more particularly disclosed in application Serial No. 389,727, filed November 2, 1953. In its application to matching inner and outer bearing raceways to determine size balls to be assembled therewith an outer ring 11 is placed over and around an upper pair of fixed gauging contacts 12 and a vertically movable lower contact 13 carried at the right hand end of arm 14. Arm 14 is pivotally mounted and during its rocking in accordance with the dimensions of the raceway of ring 11 it positions a fluid leakage orifice 15 in accordance therewith. At the same time an inner bearing ring is placed within gauging contacts at the left-hand end of the instrument; the contacts including a fixed pair of lower contacts 20 and a vertically movable upper contact 21 at the lefthand end of arm 24. A lever 29 is operatively associated with arms 14 and 24 to raise them from gauging position and to lower them into relative positions determined by the dimension of the inner race 25 and the outer race 11 respectively. As the upper gauging contact 21 is lowered into engagement with the inner race 25 arm 24 and orifice controlling surface 27 carried thereby will be positioned in accordance with the dimensions of the inner raceway. Accordingly leakage through the orifice 15 is responsive to the dimensional relationship between the inner and outer bearing raceways.

The loading apparatus illustrated is specifically provided for cooperation with the gauging contacts 20 and 21 to load an inner bearing race onto the lower pair of contacts 20 for gauging when the movable contact 21 is expanded upwardly and to remove the race from the lower contacts after gauging.

The loading apparatus comprises a housing 30 mounted on the base of the instrument 10. Housing 30 includes a back plate 31. Back plate 31 and housing 30 cooperate to form a groove 32 along their upper portions which, with loading guide 34, serves to retain a row of inner races 25 in ordered sequence for gauging.

Gauging contacts 20 and 21 extend through back plate 31 into the interior of the housing. Contact 21 extends through an elongated opening 35 provided to accommodate its vertical movements toward and from gauging position.

Races retained between groove 32 and loading guide 34 are led into an inclined supply chute 36 formed in housing 30 above and to one side of the gauging contacts. This supply chute 36 is of a length to accommodate a plurality of races and has a transverse dimension maintaining them in an ordered row.

A slide 40 is carried for vertical movement in passages formed within housing 30. It is raised and lowered manually by means of a knob 41 extending through a slot formed in the forward face of the housing.

Slide 40 includes a first upward extension 44 which has a loading chute 45 formed therein of a length sufficient to accommodate a single race and having a transverse dimension similar to that of supply chute 36. When slide 40 is moved upward it carries loading chute 45 into registry with supply chute 36 (see Figure 5) to receive a single race. Then when slide 40 is lowered it brings chute 45 into the position of Figure 4 allowing the movement of the race by gravity onto the lowermost pair of gauging contacts 20. Then when lever 29 of instrument 10 is lowered gauging contact 21 moves downward to engage the race.

Slide 40 also includes a second upward extension 47 which is extensible between gauging contacts 20. This extension has an inclined cam surface 48 at its upper end having an inclination similar to that of the supply and loading chutes. Referring again to Figure 5 it will be seen that simultaneously with the movement of loading chute 45 into registry with supply chute 36 extension 47 is carried up between contacts 20 to rock the previously gauged race about the righthand lower contact 20, through a side opening in housing 30, and into a chute 50 which carries the gauged race outward towards the operator. As slide 40 is lowered extension 47 retracts.

The sequence of operations as it would be carried out in gauging is as follows. First the apparatus would be loaded with a number of races for gauging following which knob 41 would be actuated to raise slide 40 to receive a race and then lowered to carry the race onto the lower pair of contacts 20. At this time lever 29 of the gauging instrument would be lowered to bring the gauging contacts into association with the raceways and gauge the dimensional relationships thereof. Following gauging lever 29 would be raised, carrying contact 21 away from the race. Slide 40 is then raised to carry extension 47 up between contacts 20 and eject the race from the apparatus while simultaneously bringing chute 45 into registry with supply chute 36 to receive a single race. Then upon lowering of the slide the loaded race would be carried onto the contacts 20 and the cycle would be repeated. Figure 6 discloses schematically in solid lines race 25 in gauging position with contact 21 lowered. In dotted lines extension 47 has been extended between contacts 20 to rock the race out to the right, gauging contact 21 then being raised upwardly.

Thus it is seen that an extremely simple apparatus involving only a single movable part has been provided for rapidly loading and unloading parts such as bearing races into and out of gauging position. The apparatus is economical in construction, easy to operate, and reliable for continued repeated operation through a long service life.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for loading an inner bearing race onto a lower pair of fixed gauging contacts in position for engagement by a movable upper gauging contact and for removing the race from the lower contacts following gauging, said apparatus comprising a housing provided for association with the gauging contacts, said housing including supply means for containing a number of races, a slide carried in said housing movable from a raised to a lowered position, said slide including receiving means for receiving a race from said supply means when the slide is in an upward position and for carrying the race into position for movement onto the lower contacts as the slide is lowered, said slide further including removing means extensible between the lower contacts to remove a race therefrom when the slide is raised and movable to a retracted position as the slide is lowered, whereby a race is removed from gauging position and another is positioned for gauging as the slide is raised and lowered.

2. Apparatus for loading an inner bearing race onto a lower pair of fixed gauging contacts in position for engagement by a movable upper gauging contact and for removing the race from the lower contacts following gauging, said apparatus comprising a housing provided for association with the gauging contacts, said housing including an inclined supply chute for receiving a number of races to be gauged and retaining them in a row, the lower end of said supply chute opening above and to one side of the gauging contacts, a slide carried in said housing for vertical movement, said slide including a loading chute having an inclination parallel to that of the supply chute and a length to receive a single race from said supply chute upon upward movement of the slide to carry the chutes into registry and operative to carry the race into position for movement by gravity from the loading chute onto said lower contacts as the slide is lowered, said slide further including an upward projecting removing arm terminating vertically below said loading chute and having a cam surface at its upper end extensible between the lower contacts to remove a race therefrom when the slide is raised and movable to a retracted position as the slide is lowered, whereby a race is removed from gauging position and another is positioned for gauging as the slide is raised and lowered.

3. Apparatus for loading an inner bearing race onto a lower pair of fixed gauging contacts in position for enengagement by a movable upper gauging contact and for removing the race from the lower contacts following gauging, said apparatus comprising, a vertical housing having openings in its rearward wall through which the gauging contacts extend, the upper opening being elongated to allow vertical movement of the upper gauging contact toward and from gauging position, said housing having a vertical passage therein extending closely along one side of said gauging contacts and opening through one side toward and at the level of said contacts, an inclined supply chute in said housing for containing a row of races for gauging opening into said passage at the opposite side thereof and above the gauging contacts, a slide carried for vertical movement in said housing including a vertical extension extending closely along and within said passage, said extension having a loading chute therein of an inclination similar to that of a supply chute and a length to receive a single race, actuating means connected to said slide to move it upward and carry the upper end of the loading chute into registry with the supply chute to receive a race therein and downward to carry a race into position for movement by gravity through the opposite end of the chute and onto the lower contacts, a second vertically projecting extension on said slide for extension upwards between the lowermost pair of gauging contacts, said second extension having an inclined cam surface thereon having an inclination similar to that of the supply and loading chutes, whereby a race is cammed about one of the gauging contacts and out through the side of the housing when the slide is raised, the second extension being movable to a position below the contacts when the slide is in its lowered position, whereby a race is removed from gauging position and another is positioned for gauging as the slide is raised and lowered.

4. Apparatus for loading a part onto a support for gauging and for removing the part from the support following gauging, said apparatus comprising a housing for association with the support, supply means for containing a number of parts, an actuated member carried in said housing movable from a raised to a lowered position, said member including receiving means for receiving a part from said supply means when the member is in an upward position and for lowering the part into position for movement onto said gauging support as the member is lowered, said member further including removing means for engaging and removing a part from the gauging support when the member is raised and movable clear of the support as the member is lowered, whereby a part is removed from the gauging support and another is positioned for gauging as the member is raised and lowered.

References Cited in the file of this patent

UNITED STATES PATENTS

| | | |
|---|---|---|
| 680,359 | Rist | Aug. 13, 1901 |
| 683,053 | Kottusch | Sept. 24, 1901 |
| 935,401 | Petersen | Sept. 28, 1909 |
| 1,981,692 | Dichter | Nov. 20, 1934 |
| 2,186,841 | Rylander | Jan. 9, 1940 |
| 2,556,413 | Boosey | June 12, 1951 |